United States Patent

Bozanic et al.

[15] 3,663,952
[45] May 16, 1972

[54] ELECTRON SPIN ECHO SYSTEM HAVING RF PULSE INVERSION PREPARATION OF THE SPIN ECHO SAMPLE

[72] Inventors: Donald A. Bozanic, Baltimore; Ronald W. Minarik, Lutherville; Dickron Mergerian, Baltimore, all of Md.

[73] Assignee: Westinghouse Electric Corporation, Pittsburgh, Pa.

[22] Filed: June 30, 1970

[21] Appl. No.: 51,143

[52] U.S. Cl. .................................. 324/0.5 R, 340/173 NI
[51] Int. Cl. ........................................... G01n 27/78
[58] Field of Search .............................. 324/0.5; 340/173 NI

[56] References Cited

UNITED STATES PATENTS 2,714,714  8/1955  Anderson .................. 324/0.5

OTHER PUBLICATIONS

H. J. Gerritsen, S. E. Harrison & H. R. Lewis, Chromium-Doped Titania as a Maser Material, Jour. of App. Physics, 31(9), Sept, 1960, pp. 1566–1571

*Primary Examiner*—Michael J. Lynch
*Attorney*—F. H. Henson and E. P. Klipfel

[57] ABSTRACT

Method and apparatus for inverting the population of a pair of adjacent spin levels associated with a spin-echo sample when situated in a unidirectional magnetic field by means of a preparatory inversion RF pulse of a different RF frequency from the RF frequency of the input and recall RF pulses necessary for the generation of a spin-echo signal.

12 Claims, 6 Drawing Figures

Patented May 16, 1972

3,663,952

ELECTRON SPIN ECHO SYSTEM HAVING RF PULSE INVERSION PREPARATION OF THE SPIN ECHO SAMPLE

CROSS REFERENCE TO RELATED APPLICATION

The present application is related to an invention entitled "Electron Spin Echo System Having a Pulsed Preparation Magnetic Field Applied to the Sample", in U.S. Pat. No. 3,585,494, dated June 15, 1971, in the names of Donald Andrew Bozanic, et al. The assignee of the present invention is also the same as said referenced patent application.

BACKGROUND OF THE INVENTION

1. Field of the Invention

This invention is directed to a method and apparatus for increasing the dynamic range of a spin-echo system wherein successive microwave pulses of a predetermined RF frequency separated by a time interval T are fed into a microwave transmission line in which a paramagnetic spin-echo sample is immersed in a fixed DC magnetic field thus establishing in said sample a state of thermal equilibrium with a predetermined magnetization wherein the electron spins have a population difference between a lower energy state and a higher energy state. More particularly, the present invention is directed to the concept of enhancing a spin-echo signal of a three or more spin level system such as may be obtained, for example, with a piece of titanium dioxide (rutile) as the spin-echo sample.

2. Description of the Prior Art

In a spin-echo system a sample of paramagnetic material is located in a resonant cavity situated within a fixed strong uniform magnetic field and if the sample remains there for a sufficient period of time so as to be in thermal equilibrium i.e., the resultant magnetic moment present in the material will be aligned in the direction of the field. When an RF field or "input" pulse having a frequency equal to the characteristic or Larmor frequency of the sample is applied at right angles to the fixed magnetic field, a torque is applied to the moment which causes it to be tipped away from the direction of the field. The angle of tipping, that is, the angle between the moment and the direction of the field is proportional to the magnitude of the field and the time during which the RF field exists. The tipping will be opposed by the magnetic field and since the spinning electrons act like spinning gyroscopes their axes will precess about an axis parallel to the magnetic field in much the same manner as a tipped gyroscope. Subsequently, another RF field or "recall" pulse which is also directed normal to the magnetic field is applied. After a quiescent period, the sample spontaneously develops a magnetic field of its own which is also normal to the field and which rotates around the latter's direction. The strength of this rotating field builds up and decays which is then detected as an electrical pulse called a "spin echo" signal.

Pulsed nuclear induction spin echo methods and apparatus of the type mentioned above are well known to those skilled in the art. An example of such a teaching is found in U.S. Pat. No. 2,887,673, issued to E. L. Hahn. The difference between electron and nuclear spin systems is the difference in the operating frequencies encountered. This is attributed to the smaller mass of the electron in comparison to the proton in the nucleus. The precessional or Larmor frequencies of electrons lie in the microwave range. Therefore, suitable microwave apparatus for applying a tipping field at the same microwave frequency as the Larmor frequency of the sample is required in systems based upon electron spin echoes. In general, such a requirement is satisfied by the proper design and construction of microwave resonators in which the spin sample is contained and in which RF pulses are applied and output spin echo pulses obtained.

In stimulated spin echo systems such as disclosed in U.S. Pat. Nos. 2,759,170, A. G. Anderson, et al. and U.S. Pat. No. 2,886,798, R. M. Walker, the object of these inventions is to provide storage of one or more input pulses. A strong RF pulse termed the "pre-pulse" is applied to a system prior to the entries of weaker "information" input pulses. Subsequent to the information entries, when it is desired to initiate echo formation, a second relatively heavy RF "recall" pulse is applied. This recall pulse is substantially identical with the pre-pulse and converts the divergent moment relationships to convergent relationships with the result that echo signals of the weaker information input pulses appear. The echoes follow the recollection pulse in the same order and in the same time relationships as those by which the information input pulses followed the pre-pulse. The pre-pulse is of sufficient amplitude and duration to tip all the nuclear moments of the sample substantially through 90° where during a predetermined time interval they are permitted to spread and distribute themselves throughout the XY plane by differential Larmor precession. Following this time interval, the information input pulses which are restored are applied. These pulses have the effect of depositing groups or "families" of moment vectors on a system of cones revolving about the Z axis or direction of the field $H_o$. The pulses are described as being entered into the "Z axis storage." The recollection pulse is of proper duration and amplitude to tip the revolving moment cones again into the XY plane, at the same time having the effect of reversing the relative angular motions among the constituents of each moment group. Thereupon the constituents of the respective groups reassemble to induce echo pulses in the system which appear in the same order as their corresponding entry pulses.

Although the above noted spin-echo systems function as intended, the present invention is directed to a method and means for increasing the gain of the echo signal by changing the population difference of the electrons contained in the atoms by "pre-cooling" the sample prior to the application of two RF microwave input pulses to the system for generating a spin echo signal.

SUMMARY

Briefly, the inventive concept of the present invention is directed to the improvement in the output amplitude of a spin echo signal by applying a 180° RF preparation pulse of a first microwave frequency prior to the application of the input (90°) and recall (180°) RF pulses both of a same second microwave frequency to a spin echo system containing a paramagnetic sample having at least three spin levels which may be, for example, iron doped titanium dioxide (rutile). A fixed DC magnetic field is applied whereupon the spin levels split, causing a population difference of the electronic spins to occur.

Normally the application of two successive microwave pulses at the same frequency will cause an echo signal to be produced which is proportional to the population difference between a predetermined first and a second spin level. By applying an RF pre-pulse of a different frequency from that of the microwave pulses generating the spin echo, a 180° pulse inversion takes place between the second spin level and a third yet higher level, having the effect of taking all of the spins in the second level and placing them in the third level, and vice versa. Since the number of spins in the second level has been reduced, the subsequent generation of a spin echo signal by the application of an input and a recall microwave pulse of the same frequency but different from the frequency of the prepulse will have the relatively greater signal power.

DESCRIPTION OF THE PREFERRED EMBODIMENT

Figure 1:
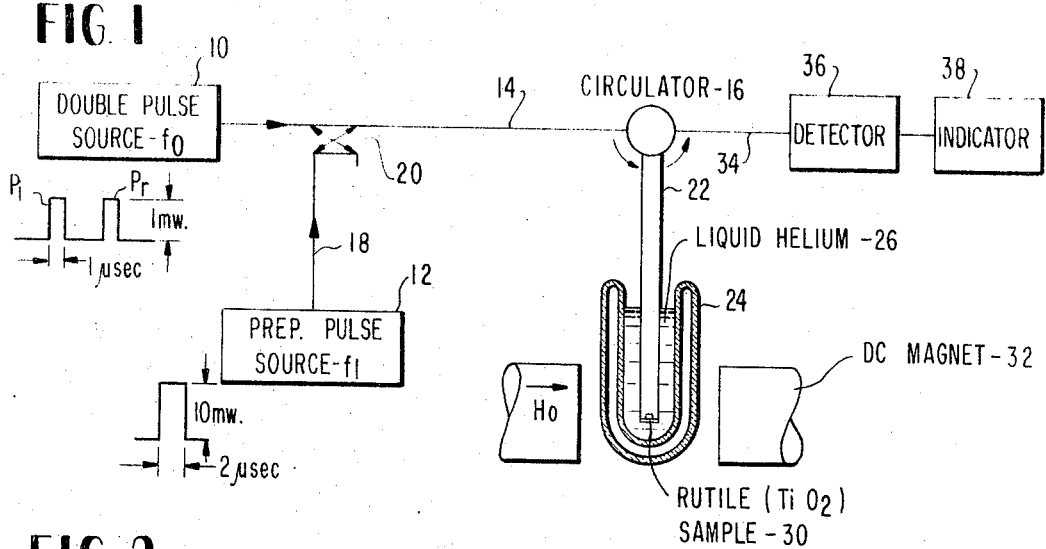
FIG. 1 is a block diagram of a first embodiment of apparatus for practicing the subject invention.

Referring now to the drawings and particularly to FIG. 1, the block diagram illustrates a first source of microwave energy 10 having a frequency of operation $f_0$ and adapted to produce microwave input and recall pulses $P_i$ and $P_r$ separated by a predetermined time interval $T$. The frequency $F_o$, for example, lies in the X-band of microwave frequencies. The pulses $P_i$ and $P_r$ typically may be, for example, one microsecond in duration, and comprise about one milliwatt of power. A second source of microwave energy 12 is disclosed having an operating frequency $f_1$ but in the same frequency band as $f_o$. It is adapted to provide a single preparation pulse output $P_p$ having a relatively greater power content, for example 10 milliwatts, as compared to the pulses $P_i$ and $P_r$. The triggering of both microwave sources 10 and 12 may be accomplished either manually or by means of an electronic synchronizer circuit, not shown. The $P_i$ and $P_r$ output from the double pulse source 10 is coupled into a microwave transmission line 14 which feeds into a circulator 16. The second microwave source 12 couples its single pulse output $P_p$ into a microwave transmission line 18 which is adapted to couple into the transmission line 14 by means of a microwave coupler 20. One output port of the circulator 16 feeds into a microwave transmission line comprising a waveguide section 22 which terminates in a cryostat 24 comprising a container filled with a cryogenic material 26 which may be, for example, liquid helium. The end termination of the microwave transmission line 22 includes a waveguide short 28 thereacross. A paramagnetic spin echo sample 30 is located therein and is preferably comprised of a high dielectric material such as iron doped titanium dioxide, hereinafter referred to as rutile, having paramagnetic defect centers in the range of $10^{14}$ to $10^{18}$ defect centers per cm³ and having a dielectric constant in the order of 100. The rutile sample 30, being located in the waveguide transmission line 22 immersed in the cryogenic material 26, is adapted to operate at cryogenic temperatures, i.e. in the region of 4° K.

Figure 3A:
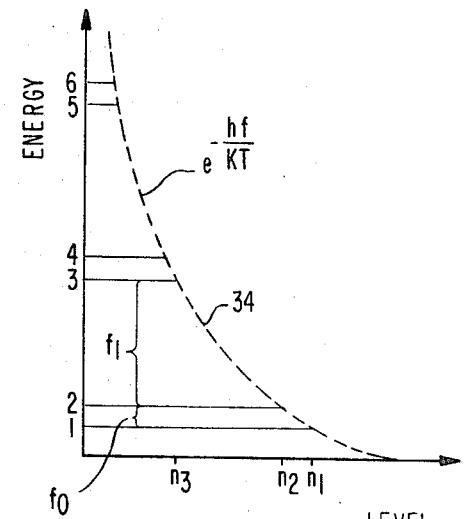
FIGS. 3a and 3b are graphical representations of the Boltzmann distribution of the population difference in the electron spins of a paramagnetic sample utilized by the subject invention and helpful in understanding the subject invention.
Figure 4:
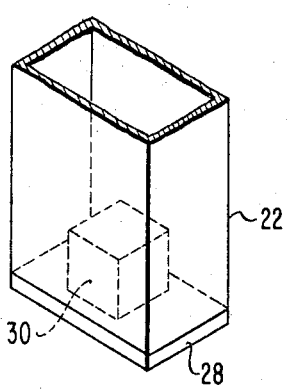
FIG. 4 is a fragmentary perspective view of the location of the paramagnetic sample in the shorted end of a microwave transmission line.
Figure 3B:
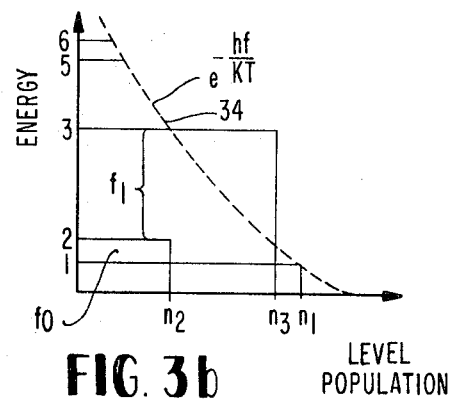

A permanent magnet 32 produces a fixed DC magnetic field $H_o$ through the rutile sample 30, causing the electron spins in the rutile sample to split into discrete energy levels that are populated according to the Boltzmann distribution $$\left(e - \frac{hf}{KT}\right)$$

which is illustrated as the curve 34 shown in FIGS. 3a and 3b so that $$n_2 = n_1 e - \frac{hf_0}{KT} \qquad n_3 = n_1 e - \frac{hf_1}{KT}, \text{etc.}$$

where $n$ = the number of electronic spins at a predetermined energy level, $h$ = Plank's constant, $f$ = the Larmor operating frequency, $K$ = the Boltzmann constant, and $T$ = temperature in degrees Kelvin.

Figure 2A:
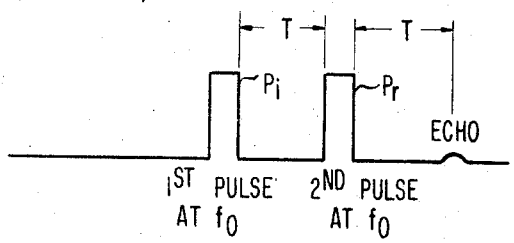
FIGS. 2a and 2b are time related waveforms illustrative respectively of the operation of prior art apparatus and the embodiment shown in FIG. 1.
Figure 2B:
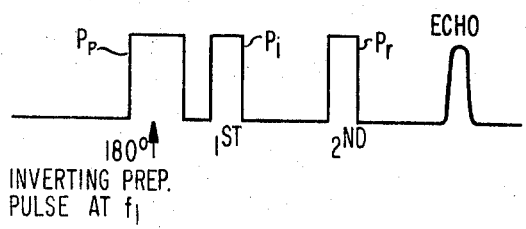

In prior art apparatus, a spin-echo signal at the frequency $f_o$ was obtained by coupling the pair of $f_o$ microwave pulses $P_i$ and $P_r$ as shown in FIG. 2A into the rutile sample 30. It is well known to those skilled in the art the first microwave pulse $P_i$ tips the axes of the electron spins of the sample away from the direction of the magnetic field $H_o$ causing the spin orientation of the electrons to precess like an infinitesimal gyroscope. When the sample is subjected to the second, or $P_r$ pulse, the spins are flipped over 180°. After a quiescent period equal in time to the time interval $T$ between the pulses $P_i$ and $P_r$ the sample develops a magnetic moment of its own normal to the field $H_o$ called the "spin-echo" signal. This spin-echo signal is then coupled back into the wave guide transmission line 22 through the circulator 16 and out another port into the microwave transmission line 34 wherein the signal is detected by means of suitable apparatus 36 and observed by means of suitable indicator means 38 coupled to the detector means 36.

The power in the echo signal is proportional to the square of the population difference between the two spin levels which are utilized. For example, referring to FIG. 3a at the operating frequency $f_o$, the power in the echo signal is proportional to the square of the difference between the number of electron spins $n_1$ in the lower, or state 1, and the number of electronic spins $n_2$ in the next higher state 2. Thus, $P_{echo} \alpha (n_1 - n_2)^2$. The subject invention is directed to the concept of increasing the power in the echo signal by applying a preparatory pulse $P_p$ of a frequency $f_1$ to the rutile sample a predetermined time prior to the application of the $f_o$ microwave pulses $P_i$ and $P_r$. The preparatory pulse $P_p$ is of a selected power and duration to perform a 180° pulse inversion between the second energy level or state 2 as shown in FIG. 3b and a selected higher level for example the third level or state 3, which has the effect of taking all of the spins $n_2$ in the second level and placing them in the third level while taking all of the spins $n_3$ in the third level and placing them in the second level. By doing this before the generation of a spin echo signal, the the signal power of the of the subsequent echo signal produced by the pulses $P_i$ and $P_r$ will then be $P_{echo} \alpha (n_1 - n_3)^2$. Because $n_3 < n_2$ there will be an increase in the echo signal power by the amount $(n_1 - n_3)^2/(An_1 - n_2)^2$.

For a Boltzmann population of electronic spin energy levels as shown in FIG. 3 and wherein the frequencies $f_o$ and $f_1$ are selected to be X-band microwave frequencies, the term $hf_o/KT \ll 1$ except at temperatures below 4° K. However, in the operating range of 4° K an approximation can be made as follows:

$$n_2 \cong n_1 \left(1 - \frac{hf_0}{KT}\right) \text{ and } n_3 \cong n_1 \left(1 - \frac{hf_1}{KT}\right)$$

so that, $$\text{GAIN} \alpha \left(\frac{n_1 - n_3}{n_1 - n_2}\right)^2 \cong \frac{(n_1 - n_1 + hf_1/KT)^2}{(n_1 - n_1 + hf_0/KT)^2} \alpha \frac{f_1^2}{f_0^2}$$

Thus the gain is proportional to the frequency ratio $(f_1/f_o)^2$. It is thus possible to obtain a gain of 20db by choosing typical X-band frequencies of $f_o = 8$ GHz and $f_1 = 80$GHz.

By utilizing a spin echo sample comprised of rutile selectively doped with iron group transition metal ions such as iron, manganese, cobalt, chromium and vanadium doped such that $10^{14}$ to $10^{18}$ defect centers per cm³ are produced the need for a resonant cavity is eliminated. By eliminating the microwave cavity several advantages are gained. First, the restrictions on the homogeneity of the magnetic field $H_0$ are reduced, since one utilizing a sample of rutile at X-band frequencies need only use a very small sample in the order of 0.075 inches for proper operation. Secondly, the system is less bulky and simpler to manufacture since one does not require a cavity with iris coupling holes, tuning arrangements, etc. Thirdly, the dielectric cavity modes observed at X-band frequencies in rutile couple very strongly to the spin system so that a significant improvement in the insertion loss of the system over prior art apparatus utilizing for example quartz or silicon is obtained. Of the iron group transition metal ions utilized for doping, iron is preferably as the paramagnetic impurity since the iron ion couples very strongly to the spin-lattice.

Having thus described the present invention with respect to an illustrative embodiment thereof,

We claim as our invention:

1. An electron spin-echo system comprising in combination:
   microwave transmission line means and a spin-echo sample located therein;
   DC magnet means located adjacent said microwave transmission line means in the vicinity of said spin-echo sample to provide a fixed unidirectional magnetic field therethrough which splits the spins of said sample into discrete energy levels having a Boltzmann distribution;
   means generating and coupling a first pulse of RF energy at a first predetermined frequency to said microwave transmission line means and said spin-echo sample;

second means generating and coupling a pair of RF pulses of a second frequency different from said first predetermined frequency and separated by a predetermined time interval to said microwave transmission line means and said spin-echo sample subsequent to the application of said first RF pulse, said first RF pulse effecting a 180° inversion to reverse the spin population between a selected pair of electron spin levels, whereupon said pair of RF pulses at said second predetermined frequency causes a spin-echo signal of said second predetermined frequency to be produced at a relatively higher power gain; and means for coupling said spin-echo signal out of said transmission line means.

2. The invention as defined by claim 1 wherein said iron group transition metal ions are selected from the group consisting of iron, manganese, cobalt, chromium and vanadium.

3. The invention as defined by claim 1 wherein said spin-echo sample is comprised of iron doped rutile.

4. The invention as defined by claim 3 and additionally including means surrounding said transmission line means and said spin-echo sample for reducing the temperature of said sample to a predetermined cryogenic temperature.

5. The invention as defined by claim 4 wherein said means producing said RF pulses include microwave signal generators.

6. The invention as defined by claim 5 wherein said microwave signal generators are comprised of X-band signal generators.

7. The invention as defined by claim 6 wherein said predetermined cryogenic temperatures in the region of 4° Kelvin.

8. The invention as defined in claim 1, wherein said sample comprises rutile doped with iron group transition metal ions.

9. The invention as defined in claim 8, wherein said rutile sample has a doping concentration in the range of $1 \times 10^{14}$ to $1 \times 10^{18}$ defect centers/cm$^3$.

10. The method of increasing the dynamic range of a spin-echo signal comprising the steps of:

generating a fixed DC magnetic field of a predetermined field strength;

locating a spin-echo sample within a microwave transmission line and positioning said transmission line containing said spin echo sample within said DC magnetic field;

applying a first pulse of RF energy of a first predetermined frequency to said sample for inverting the spin populations of a selected pair of electron spin levels; and subsequently applying a pair of pulses of RF energy of a second predetermined frequency different from the frequency of said first RF pulses in a predetermined time relationship for producing a spin-echo signal.

11. The method as defined by claim 10 and additionally including the step of reducing the temperature of said spin-echo sample to a predetermined cryogenic temperature.

12. The method as defined by claim 11 wherein said sample comprises rutile doped with iron group transition metal ions.

* * * * *